United States Patent
Click, Jr. et al.

(10) Patent No.: US 6,408,433 B1
(45) Date of Patent: Jun. 18, 2002

(54) METHOD AND APPARATUS FOR BUILDING CALLING CONVENTION PROLOG AND EPILOG CODE USING A REGISTER ALLOCATOR

(75) Inventors: Clifford N. Click, Jr.; Christopher A. Vick, both of San Jose; Michael H. Paleczny, Sunnyvale, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/298,411

(22) Filed: Apr. 23, 1999

(51) Int. Cl.[7] .................................................. G06F 9/45
(52) U.S. Cl. ...................................... 717/154; 717/159
(58) Field of Search ............................... 717/9, 159, 154

(56) References Cited

U.S. PATENT DOCUMENTS

| | | | | |
|---|---|---|---|---|
| 5,784,066 A | * | 7/1998 | Aizikowitz et al. | 345/440 |
| 5,790,862 A | * | 8/1998 | Tanaka et al. | 717/5 |
| 6,072,952 A | * | 6/2000 | Janakiraman | 717/9 |

OTHER PUBLICATIONS

Valluri et al., Evaluating Register Allocation . . . , 1999, IEEE, pp. 1–6.*
Pinto et al., Register Files Constraing Satisfaction . . . , 1999, IEEE, pp. 1–4.*
Park et al., Optimistic Register Coalescing, 1998, IEEE, pp. 1–9.*
Nachrichtentechnic et al., Cooperative Register Assignment . . . , 1997, IEEE, pp. 691–694.*
Karger, P., Using Registers to Optimize . . . , 1989, ACM, pp. 194–204.*
Lo et al., Register Promotion . . . , 1998, ACM, pp. 26–37.*
Koeseki et al., A Register Allocation Technique . . . , IEEE, 1997, pp. 404–411.*

* cited by examiner

Primary Examiner—Gregory Morse
Assistant Examiner—John Q. Chavis
(74) Attorney, Agent, or Firm—Beyer Weaver & Thomas, LLP

(57) ABSTRACT

Methods and apparatus for enabling a register allocator to build a calling convention are disclosed. According to one aspect of the present invention, a computer-implemented method for generating code associated with a calling convention includes obtaining compilable source code, and identifying at least one argument associated with the calling convention. The location of the argument with respect to memory space is described by a register mask. The method also includes performing a register allocation using a register allocator that is arranged to allocate registers. During the register allocation, code associated with the calling convention is produced automatically by the spill-code mechanism in the allocator without requiring the use of a specialized prolog or epilog code generator.

12 Claims, 9 Drawing Sheets

METHOD AND APPARATUS FOR BUILDING CALLING CONVENTION PROLOG AND EPILOG CODE USING A REGISTER ALLOCATOR

CROSS REFERENCE TO RELATED APPLICATION

This application is related to U.S. application Ser. No. 09/298,318, filed concurrently herewith, which is incorporated herein by reference in its entirety.

BACKGROUND OF THE INVENTION

1. Field of Invention

The present invention relates generally to methods and apparatus for improving the performance of software applications. More particularly, the present invention relates to methods and apparatus for enabling a register allocator to build calling convention prolog and epilog code for subroutine calls.

2. Description of the Related Art

In an effort to increase the efficiency associated with the execution of computer programs, many computer programs are "optimized" during a compilation process. Optimizing a computer program generally serves to eliminate portions of computer code which are essentially unused. In addition, optimizing a computer program as a part of a compilation process may restructure computational operations to allow overall computations to be performed more efficiently, thereby consuming fewer computer resources.

An optimizer is arranged to effectively transform or otherwise compile a computer program, e.g., a computer program written in a programming language such as C++, FORTRAN, or Java bytecodes, into a faster program. The faster, or optimized, program generally includes substantially all the same, observable behaviors as the original, or pre-converted, computer program. Specifically, the optimized program includes the same mathematical behavior as its associated original program. However, the optimized program generally recreates the same mathematical behavior with fewer computations.

As will be appreciated by those skilled in the art, an optimizer generally includes a register allocator which is arranged to control the use of registers within an optimized, or otherwise compiled, internal representation of a program. A register allocator allocates register space in which data associated with a program may be stored. A register is a location associated with a processor of a computer that may be accessed relatively quickly, as compared to the speed associated with accessing "regular" memory space, e.g., stack space which is partitioned into stack slots, associated with a computer.

Prior to a register allocation process, a set of values, i.e., incoming arguments, are known to a compiler, and are in fixed locations as specified by a calling convention. A calling convention, as will be appreciated by those skilled in the art, is generally a convention by which calls to a subroutine are made. A calling convention typically specifies where arguments are passed, i.e., which register or stack slot each argument appears in. In addition, a calling convention may specify which registers must be preserved across the subroutine, i.e., callee-save registers. If callee-save registers are used in the subroutine, the callee-save registers generally need to be saved and restored. The calling convention may also specify whether some registers are unused or used for special purposes. Saving and restoring registers, along with any other special handling, typically occurs at the entry and exit of subroutines, and is called prolog and epilog code. Additional information is available after the register allocation process is completed. Such additional information includes, but is not limited to, the stack frame size associated with the subroutine and a set of registers, which is to be saved and restored.

FIG. 1 is a diagrammatic representation of a compiler which includes a register allocator and a calling convention code generator. Source code 102 is provided as input to a compiler 106, which may be an optimizing compiler. Typically, source code 102 includes a call 108 to a subroutine 110, as well as incoming arguments 112 associated with call 108. Specifically, the location of incoming arguments 112 is specified with respect to call 108.

A register allocator 116, which is included in compiler 106, is arranged to allocate memory space for use by source code 102. After register allocator 116 performs a register allocation, a calling convention code generator 118 generates prolog and epilog code associated with source code 102. By way of example, if any callee-save register is used in any part of the allocation, then code which is used to save and to restore the callee-save register is inserted into the prolog and epilog code. Prolog and epilog code is included in an internal representation 120 of source code 102. Once internal representation 120 is generated, compiler 106 creates machine instructions 124 from internal representation 120.

Internal representation 120 includes copy, load, and store instructions that are associated with definitions and uses of variables, in addition to a calling convention for a subroutine. As shown, variables, or values, "c" and "d" are stored on a stack. Variable "d" must be spilled across the subroutine call, as will be appreciated by those skilled in the art. Hence, variable "d" is reloaded from a stack after the subroutine call to "foo."

With reference to FIG. 2, a process of generating machine instructions from source code which includes calling conventions will be described. The process 202 generally involves the conversion of "virtual" registers into "real" registers, as will be appreciated by those skilled in the art. Prior to allocation, the compiler assumes that it has an unlimited number of "virtual" registers to work with. It is the job of the allocator to map the unlimited virtual registers into the very limited set of real registers that the overall machine has. Process 202 begins at step 204 in which calling convention code is inserted into source code obtained by a compiler.

Typically, after the compiler inserts calling convention code, or code associated with a convention by which a subroutine call may be made, the compiler studies the calling convention in step 206. Specifically, the compiler studies an incoming argument associated with the calling convention. In step 208, a determination is made as to whether the incoming value, or argument, is associated with a register or a stack location, e.g., a stack slot. When it is determined that the incoming argument is stored in a register, then process flow moves to step 216 where the incoming value is copied to a virtual register. Typically, the copying is performed using a register-to-register copy command.

Once the incoming value is copied into a virtual register, then in step 212, register allocation is performed. The steps associated with performing a register allocation will be discussed below with respect to FIG. 3. A register allocation process generates allocation choices. That is, an overall register allocation process may be used to determine how different values are assigned to registers, i.e., "real" registers, and stack slots. After the register allocation process is completed, then the allocation choices generated by the register allocation process are converted into machine instructions by the compiler in step 214. It should be appreciated that turning allocation choices into machine instructions includes building prolog and epilog code using information obtained during the register allocation process. The process of creating machine instructions is completed once allocation choices have been converted.

Returning to step 208 and the determination of whether an incoming value is associated with a register or a stack location, when it is determined that the incoming value is stored in a stack location, then in step 210, the incoming value is loaded into a virtual register. From step 210, process flow proceeds to step 212 where a register allocation is performed.

FIG. 3 is a process flow diagram which illustrates the steps associated with allocating stack space, i.e., step 212 of FIG. 2, in response to coloring an interference graph. The process 212 of allocating memory associated with a segment of source code begins at step 302 in which an interference graph is constructed for the segment of source code. After the interference graph is constructed, an attempt is made to color the interference graph in step 306. Typically, a variety of different methods may be applied in an attempt to color the interference graph. Once the attempt is made to color the interference graph in step 306, a determination is made in step 310 as to whether the attempt to color the interference graph was successful. In other words, a determination is made regarding whether each variable associated with the interference graph was successfully assigned to a register without conflict.

If the determination is that the attempt to color was not successful, then the implication is that not enough registers are available for each variable in the segment of source code to be assigned a register without interference. Since the number of registers in a processor is fixed, when there is no register space available for the storage of code, "spill code" is identified. The spill code is code that moves data to and from stack slots in an effort to reduce the number of registers that are simultaneously required, as will be understood by those skilled in the art. A stack slot is a piece of a stack frame which an allocator uses to hold information when all registers are full. Typically, an optimizer includes a specialized stack slot allocator that is arranged to allocate stack slots for spill code as needed. Stack slots for spill code are also generally needed when arguments which are beyond arguments which fit in the registers are passed on a stack.

If the determination in step 310 is that the attempt to color the interference graph was not successful, process flow moves from step 310 to step 314 in which a list of live ranges is obtained as spill candidates. That is, variables which may be spilled into stack slots are identified.

Once spill candidates are identified, then in step 318, load instructions and store instructions are assigned around definitions and uses in the segment of source code. Specifically, a load command to load a variable is inserted before a use of the variable in the segment of source code, while a store instruction to store a variable is inserted after the variable is defined in the segment of source code.

After the load instructions and store instructions, i.e., loads and stores, are assigned, a stack slot is allocated for each load and store in step 322. In general, a stack slot allocator which is separate from a register allocator is used to allocate the stack slots. While a stack slot allocator is separate from a register allocator, it should be understood that both allocators may be included in an optimizer or a compiler. Allocating the stack slots allows spill candidates to be spilled into the stack slots. From step 322, process flow returns to step 302 where an interference graph is constructed.

Returning to step 310, if the determination that the attempt to color the interference graph was successful, then the implication is that each variable has successfully been associated with either a register or a stack slot. Hence, process flow moves to step 326 in which the allocation is cleaned up, or finalized. During the cleaning of an allocation, stack slot numbers are converted to offsets into the stack frame, copies are manifested as loads or stores as required, actual register numbers are inserted into the machine instructions, and other house-cleaning chores are attended to, as will be appreciated by those skilled in the art.

The requirement of having to complete a register allocation process before a calling convention may be built, e.g., before machine instructions for a calling convention may be generated, has several shortcomings. For example, in order to generate prolog and epilog code, a special piece of code arranged to generate the prolog and epilog code must be used. Such code could contain bugs and, at a minimum, requires debugging. Further, such code is also often machine-dependent, thereby decreasing the portability of the code.

Therefore, what is desired is a method and an apparatus for efficiently generating machine instructions for a calling convention such that the machine instructions may be readily ported between different computing systems. Such a method and apparatus would further allow the spill code heuristics to choose whether or not to spill a callee-save register and remove the need for specialized prolog and epilog code generation. Specifically, what is needed is a method and an apparatus for enabling a register allocator to essentially build a calling convention.

SUMMARY OF THE INVENTION

The present invention relates to the use of a register allocator in creating a calling convention. According to one aspect of the present invention, a computer-implemented method for generating code associated with a calling convention includes obtaining compilable source code, and identifying at least one argument associated with the calling convention. The location of the argument with respect to memory space is described by a register mask. The method also includes performing a register allocation using a register allocator that is arranged to allocate registers. During the register allocation, code associated with the calling convention is produced.

In accordance with another aspect of the present invention, a computer-implemented method for building a calling convention associated with a call to a subroutine in an object-based system includes obtaining source code that is suitable for compilation, creating a plurality of register masks each having an associated variable with an associated live range, and determining an intersection of the plurality of register masks. A register allocation is performed using the intersection. The register allocation, in addition to allocating registers, generates code associated with the calling convention. In one embodiment, the method further includes converting the code associated with the calling convention into machine instructions, the machine instructions being suitable for execution by a computing system.

By allowing a calling convention to be built during a register allocation process, i.e., when a register allocator substantially automatically generates calling convention code, the calling convention may be readily characterized. The allocator may be arranged to efficiently perform an allocation. In addition, when a register allocator generates calling convention code, the source code from which the calling convention code is generated may be readily ported between different platforms.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Figure 1:
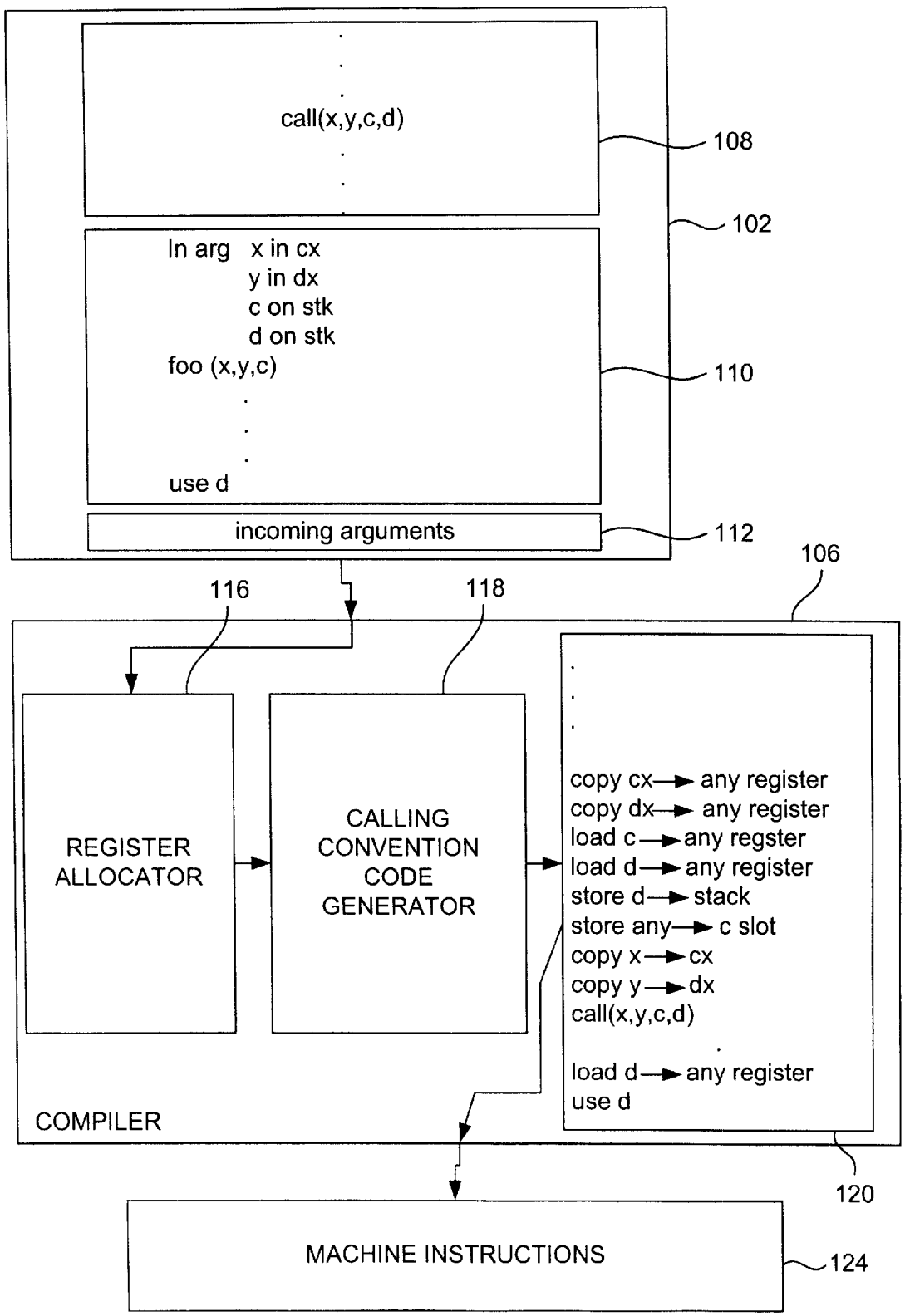
FIG. 1 is a diagrammatic representation of a compiler which is arranged to build a calling convention.
Figure 2:
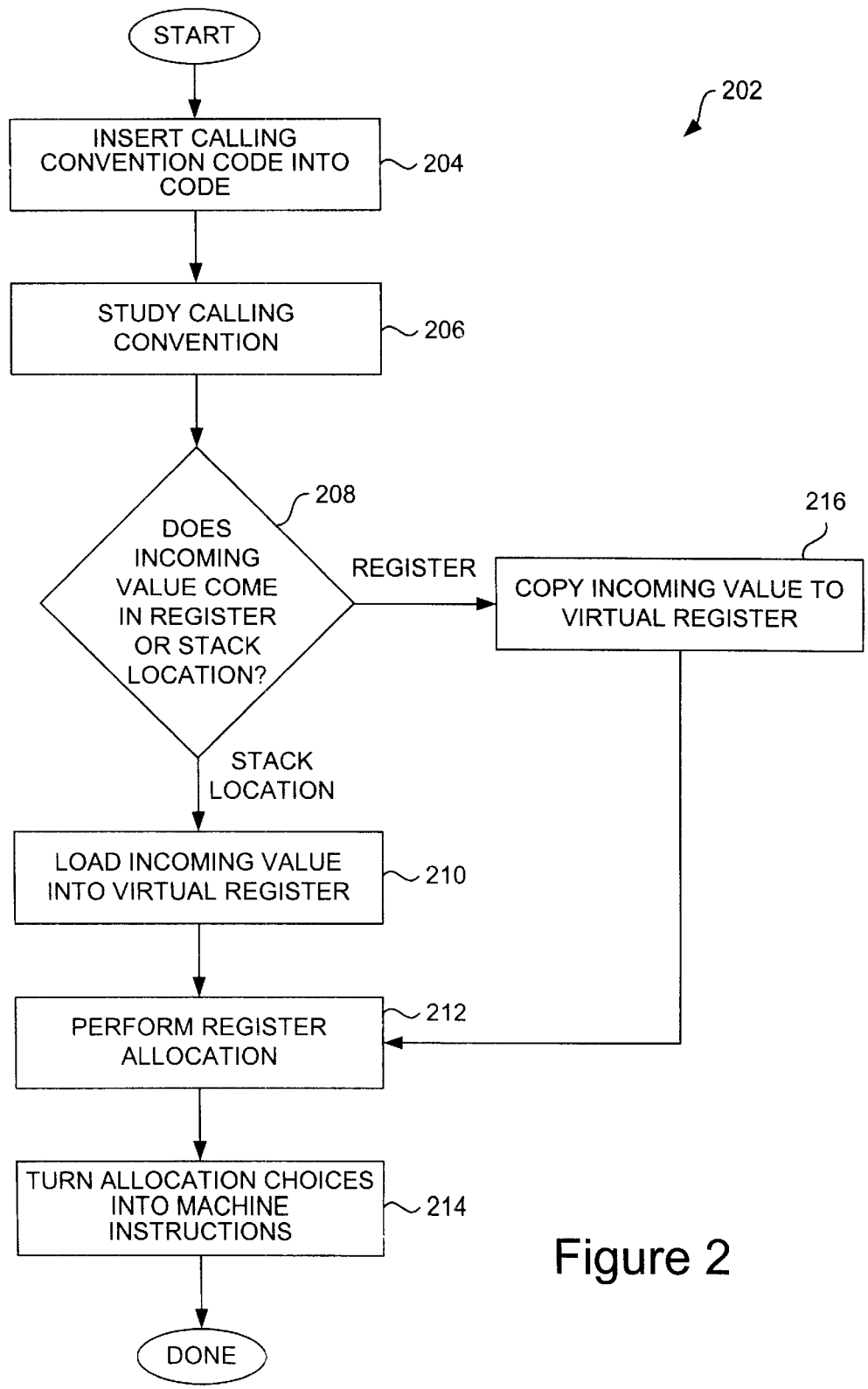
FIG. 2 is a process flow diagram which illustrates the steps associated with generating machine instructions.
Figure 3:
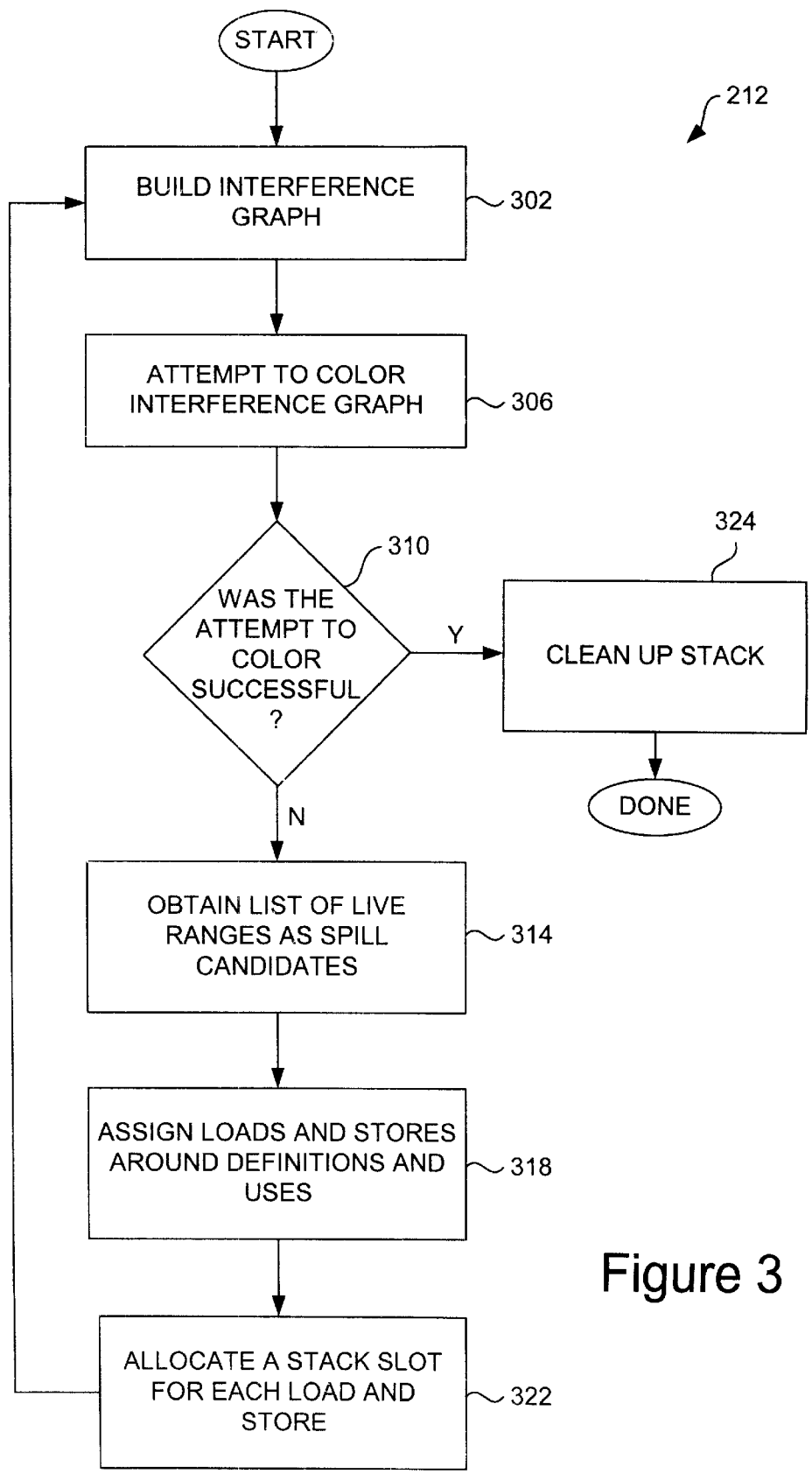
FIG. 3 is a process flow diagram which illustrates the steps associated with a process of allocating stack space, i.e., step 212 of FIG. 2.

A compiler, e.g., an optimizing compiler, often includes a stack slot allocator that is used to allocate stack slots to hold variables which may not be stored in registers due to the fact that the number of registers associated with a processor is finite. Such compilers also generally include a calling convention code generator which is arranged to build subroutine calling convention code. Before a compiler performs register allocation, a set of values, i.e., incoming arguments, are in fixed locations specified by a calling convention. In order to build a calling convention, additional information such as the size of an associated stack frame and the set of registers used to store variables associated with the calling convention are needed. Such information is typically not available until after the register allocation process is completed. By requiring a register allocation process to occur prior to building a calling convention, the portability of code including calling convention code is reduced, as small changes to the calling conventions may cause large platform-based changes in calling convention code.

When stack-based values or variables are treated in the same manner as machine registers, a specialized stack slot allocator will not be required, as discussed in above-referenced U.S. patent application Ser. No. 09/298,318, which is incorporated by reference in its entirety. Using a register allocator to allocate stack slots enables the stack slots to be treated in the same manner as registers, thereby eliminating bugs associated with the heuristics that are commonly used to treat values store in stack slots.

Further, using a register allocator to substantially automatically generate calling convention code allows calling convention code to be generated when locations for incoming arguments to a subroutine call are known. Specifically, by effectively integrating the allocation of instruction, i.e., subroutine call, inputs and instruction results with the allocation of arguments, the register allocator may generate calling convention code.

Allowing the register allocator to generate calling convention code typically has a minimal effect on the register allocator. By way of example, the register allocator may be impacted by the setting of initial conditions. Hence, the use of a register allocator to generate calling convention code increases the flexibility of overall code which includes the calling convention code, and enables the code to execute more quickly. In addition, the use of a register allocator to generate calling convention code enables the calling convention code to be substantially machine independent. For example, the allocator is informed of the actual initial location of incoming arguments, instead of having them immediately moved to virtual registers. If the incoming location is considered to be satisfactory, then the move to a virtual register is avoided. As will be discussed below with respect to FIG. 4a, an argument 'd' is passed on the stack. If argument "d" is hoisted to a virtual register, it will have to be spilled across a call to foo. Leaving argument "d" on the stack in its initial location avoids this spill.

In one embodiment, a spill code mechanism is arranged to build the prolog and epilog code, and a relatively simple interface may be used to describe the behavior of callee-save registers, thereby making it relatively easy to port the interface to different central processing units (CPUs). Such an interface may also enable a set of callee-save registers, i.e., the calling convention on the same CPU, to be changed. The use of a spill code mechanism to build calling convention code, e.g., prolog and epilog code, allows the spill candidate selection heuristics to combine in a global way the effects of spilling a callee-save register or not spilling a callee-save register. Conventional spill candidate selection techniques were generally deficient in that they either "eagerly" grabbed callee-save registers, perhaps forcing callee-save registers to be spilled in a common case in order to make them available in infrequently executed code, or they forced a decision regarding whether or not to use a callee-save register locally with no ability to see the effect of this decision across the entire allocation.

Instead of inserting calling convention code, in the described embodiment, a register allocator declares substantially all callee-save registers to be live on entry and used at exit, e.g., live on entry into a subroutine and used at the exit of the subroutine. Such declarations effectively create a set of live ranges that are relatively long, e.g., they may cover an entire method, and have substantially only a single use and substantially only a single definition. Such live ranges make ideal spill candidates, if required.

If a callee-save live range is spilled, then the loads and stores inserted for that live range will appear to be traditional prolog and epilog code. It should be appreciated that no special prolog or epilog code generator is needed, as the very act of spilling callee-save live ranges using a conventional spill mechanism will generate the prolog and epilog code.

Figure 4A:
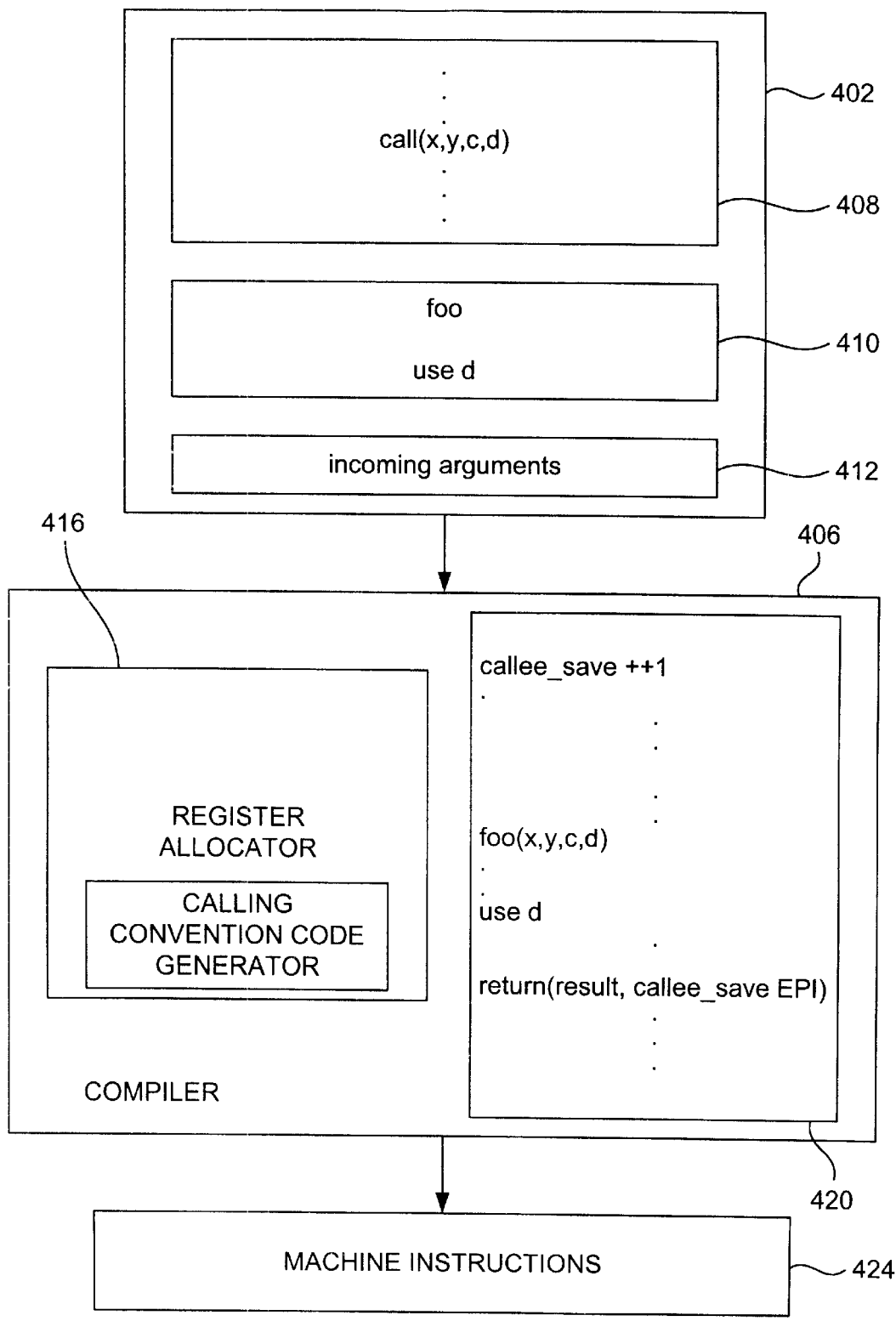
FIG. 4a is a diagrammatic representation of a compiler which includes a register allocator that is arranged to build a calling convention in accordance with an embodiment of the present invention.

Referring to FIG. 4a, a compiler which includes a register allocator that is arranged to generate calling convention code will be described in accordance with an embodiment of the present invention. Source code 402 is provided as input to a compiler 406, which, in the described embodiment, is an optimizing compiler. Source code 402 includes a call 408 to a subroutine 410, as well as incoming arguments 412. Incoming arguments 412 are associated with call 108, i.e., the location of incoming arguments 112 is specified with respect to call 108. The location of incoming arguments may be specified in register masks, as will be described below with reference to FIG. 4b. In one embodiment, each incoming argument has an associated register mask.

A register allocator 416, which is included in optimizing compiler 406, is arranged to allocate memory space for use by source code 402. As will be discussed below with respect to FIGS. 5 and 6, register allocator 416 is arranged to allocate stack space in the same manner as register space is allocated. Register allocator 416 is further arranged to use incoming arguments 412 to create calling convention code, which is included in an internal representation 420 of source code 402. In other words, live ranges for the callee-save registers are added. In FIG. 4a, a live range for machine register EDI is added; it is defined to be live on entry to the subroutine and is required to be back in EDI when the subroutine returns. Optimizing compiler 406 is further arranged to convert internal representation 420 into machine instructions 424 that are suitable for execution.

As previously mentioned, each incoming argument, or input variable, that is used by a register allocator to build a calling convention may have an associated register mask. A register mask is a collection of bits, or bit masks, that represent valid registers and, in some cases, stack slots. In other words, a register mask is a number space that is arranged to represent all possible machine registers and, if appropriate, stack slots. The number of bits in a register mask may vary depending upon the platform upon which machine instructions are to be executed. By way of example, on an Intel platform, e.g., a platform with a Pentium processor available commercially from Intel Corporation of Santa Clara, Calif., a register mask may be a collection of ninety-six bits.

Figure 4B:
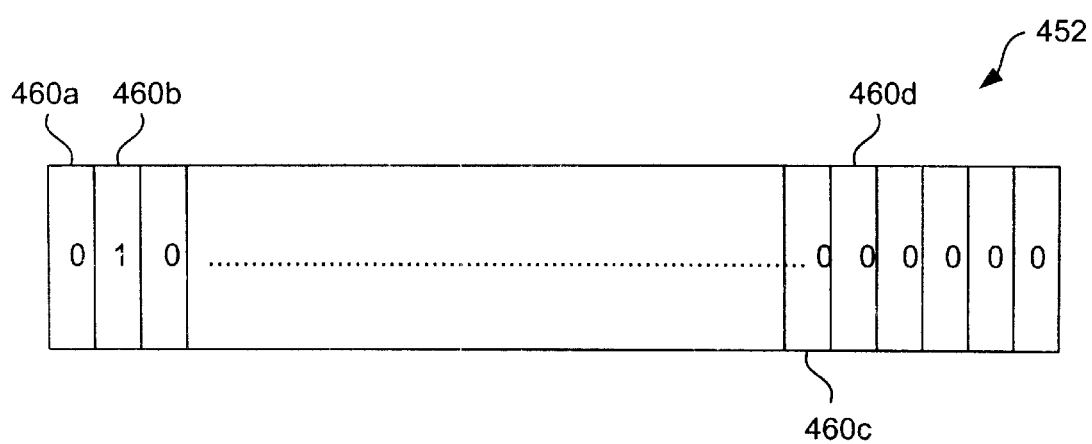
FIG. 4b is a diagrammatic representation of a register mask in accordance with an embodiment of the present invention.

FIG. 4b is a diagrammatic representation of a register mask in accordance with an embodiment of the present invention. A register mask 452 includes multiple bits 460. Each bit 460 is set to indicate whether a particular register is valid with respect to the variable with which register mask 452 is associated. The number of bits 460 is dependent, at least in part, upon the number of registers or stack slots that are associated with a particular processor. In the described embodiment, when a bit, e.g., bit 460b, is set to a value of "1," the implication is that the register associated with bit 460b is valid. Alternatively, when a bit, e.g., bit 460a, is set to a value of "0," the indication is that the associated register is not valid. In one embodiment, at most one bit 460 is set, i.e., set to "1," in register mask 452, since bits 460 represent single precision values such as integers or floats. In another embodiment, two bits 460 may be set, as for example when bits 460 represent long integers.

Figure 5:
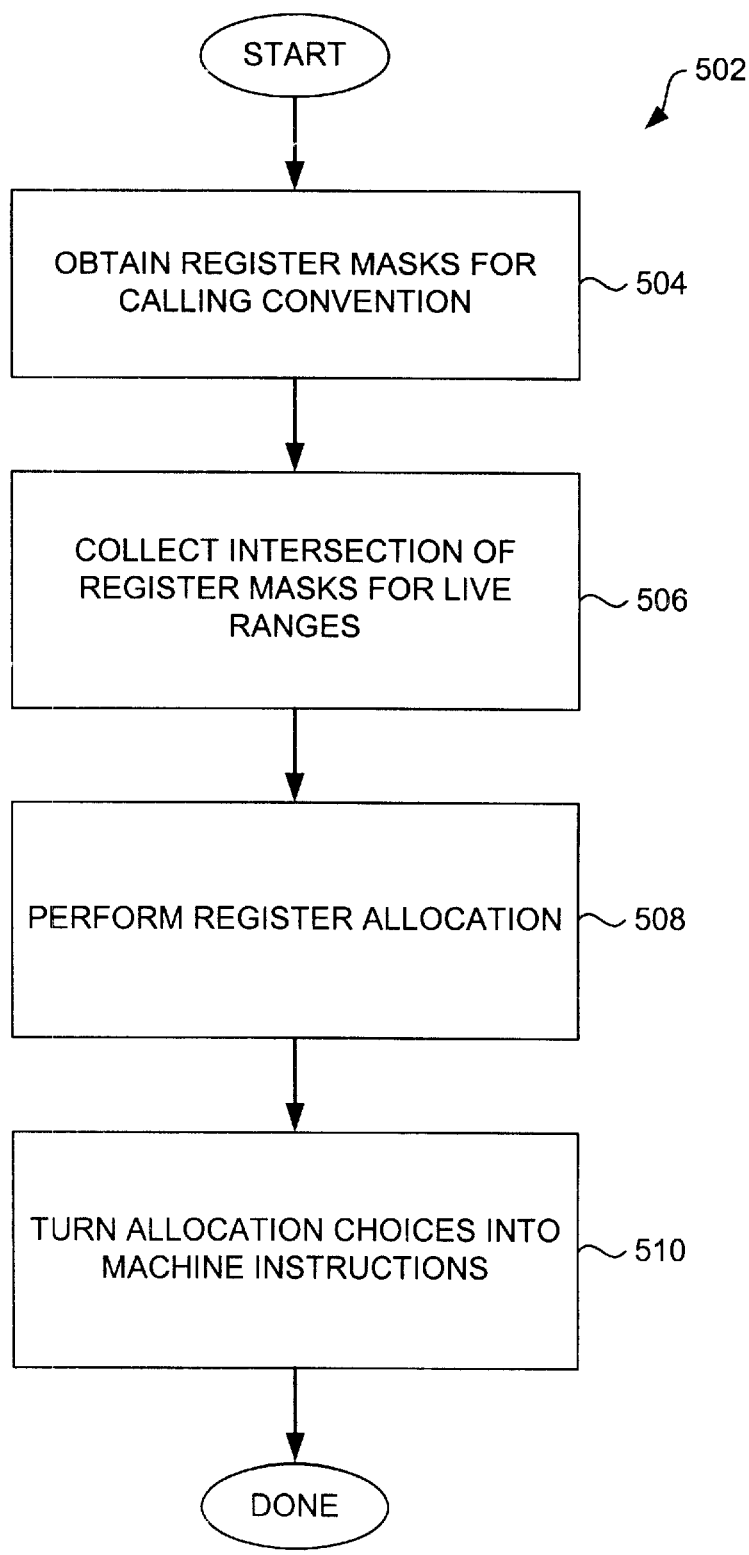
FIG. 5 is a process flow diagram which illustrates the steps associated with generating machine instructions in accordance with an embodiment of the present invention.

FIG. 5 is a process flow diagram which illustrates the steps associated with generating machine instructions in accordance with an embodiment of the present invention. Specifically, the steps associated with generating machine instructions with calling conventions which are determined by a register allocator will be described. The process 502 of generating machine instructions using an optimizing compiler, which includes a register allocator, begins at step 504 in which register masks are obtained for the calling convention. As described above, a register mask is a collection of bits, or a bit mask, that represents a collection of valid registers and, in some cases, stack slots. The number of bits included in a register mask may vary widely depending, for example, upon the type of processor associated with a computing system. The register mask is effectively used to describe the location of a value associated with a calling convention.

Once register masks are obtained, then in step 506, the intersection of register masks are collected for live ranges. A live range, as previously mentioned, is a range or distance over which a particular variable remains accessible, as described in above-referenced U.S. patent application Ser. No. 09/298,318. The intersection of register masks generally identifies registers or stack slots that are used by more than one value. In other words, the intersection of register masks provides a set of "nodes" for an interference graph coloring process, as will be discussed below with reference to FIG. 6. The use of the intersection of register masks simplifies a coloring process, as a leftover color will typically be in existence. If, after intersecting the register masks for a particular live range, the register mask has no colors, then this live range must spill immediately. For example, if an incoming argument is passed in register ECX but used as an outgoing argument in EDX, then the intersection of registers masks containing only ECX and EDX will be empty. As a minimum, a copy between ECX and EDX is required.

After the intersection of register masks are obtained, then register allocation is performed in step 508. One embodiment of a method for allowing an optimizing compiler to allocate registers and stack slots will be discussed below with reference to FIG. 6. The register allocation generates allocation choices that include calling convention code. The allocation choices that result from the register allocation process of step 508 are converted into machine instructions on step 510. Typically, the optimizing compiler converts the allocation choices into machine instructions. Once the allocation choices are converted, the process of generating machine instructions is completed.

Figure 6:
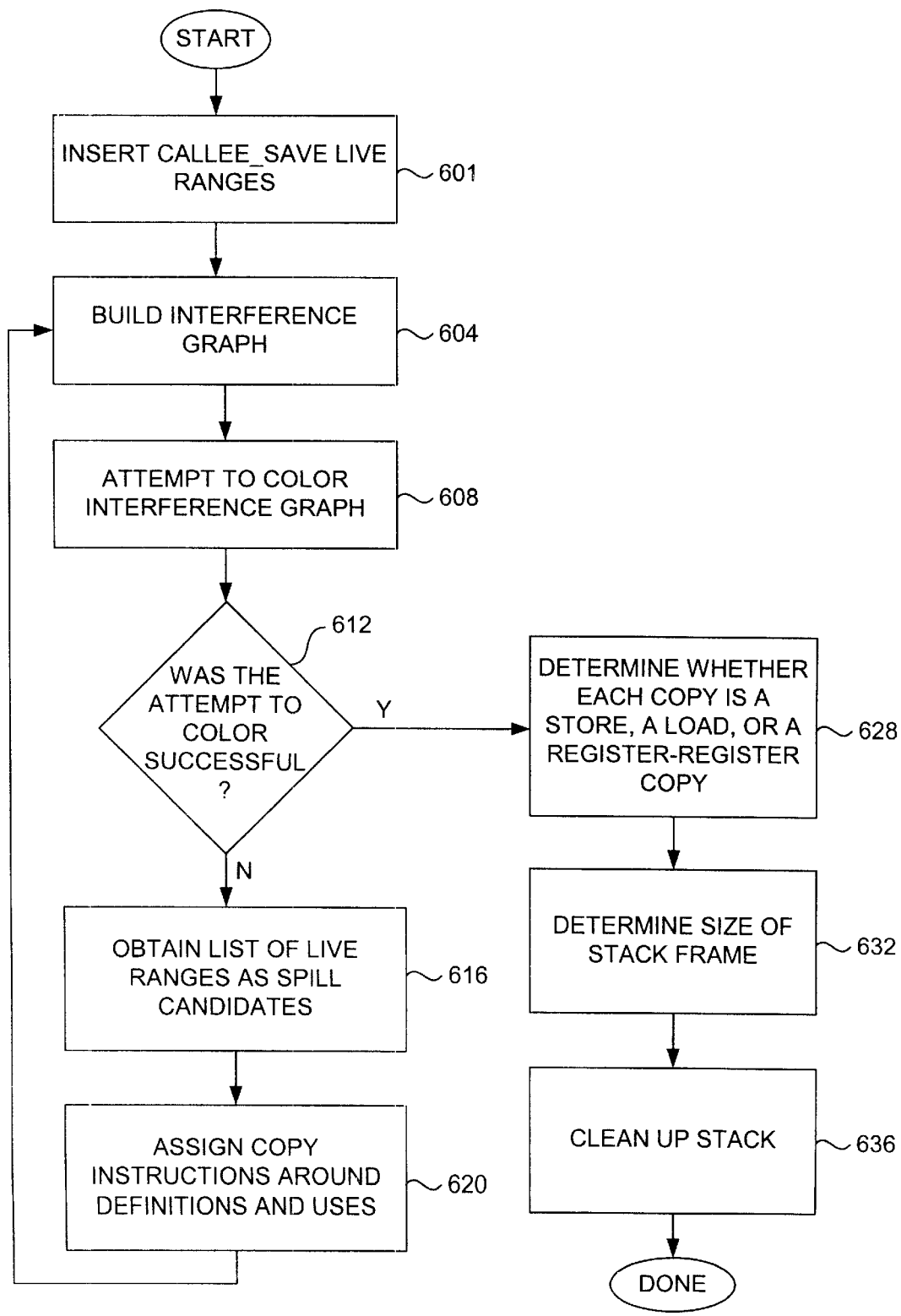
FIG. 6 is a process flow diagram which illustrates the steps associated with a process of allocating stack slots, i.e., step 508 of FIG. 4, in accordance with an embodiment of the present invention.

With reference to FIG. 6, the steps associated one process of allocating registers and stack slots, as appropriate, i.e., step 508 of FIG. 5, will be described in accordance with an embodiment of the present invention. Specifically, FIG. 6 describes the performance of an interference graph coloring on source code in conjunction with allocating registers and stack slots. Register allocation processes are often associated with interference graph coloring processes. The process of allocating memory space begins at step 601 in which callee-save live ranges are inserted with respect to the source code. Process flow moves from step 601 to step 604 in which an interference graph is created, or "built," for a particular segment of source code. The segment of source code may generally be a section of a software application written in substantially any suitable programming language, e.g., the C programming language or Java bytecodes. In general, the creation of an interference graph involves representing live ranges associated with variables, or values, in the source code and representing interferences between live ranges, as previously discussed. The "nodes" of the interference graph are obtained from the intersection of the register masks, as mentioned previously with respect to FIG. 5.

Once the interference graph is built, then an attempt is made to color the interference graph in step 608. Coloring the interference graph involves assigning registers to different variables without conflicts or interference. As will be appreciated by those skilled in the art, the methods used to color an interference graph to perform register allocation may vary widely. Such methods may include, but are not limited to, the Briggs-Chaitin register allocation method, the Chow style allocation method, and the linear scan allocation method.

A determination is made in step 612 as to whether the attempt to color the interference graph was successful. In other words, a determination is made regarding whether registers may be assigned to all variables associated with the interference graph without any conflicts. When it is determined that the attempt to color the interference graph was not successfull, then the indication is that there are not enough registers to enable all variables associated with the interference graph to be assigned without conflict. As such, in the described embodiment, stack slots are allocated for storage of variables when all available registers are used.

Process flow moves from step 612 to step 616 where a list of live ranges associated with the interference graph is obtained as spill candidates. That is, values which may be spilled into stack slots are identified. In general, substantially any heuristic may be used to choose the spill candidates. Typically, choices will include the set-up callee-save live ranges, i.e., the set up in step 601, before the an attempt is made at coloring an interference graph. Callee-save live ranges may be selected as part of the spill candidate selection process. Spilling a callee-save live range, in the described embodiment, effectively builds prolog and epilog code.

After spill candidates are identified, in step 620, copy instructions are effectively assigned or inserted around definitions and uses associated with the spill candidates. In the described embodiment, a copy instruction is assigned after a definition associated with a spill candidate and before an instruction that is associated with, e.g., uses, a spill candidate. A copy instruction that is assigned around a definition or a use instruction typically has the appearance of a register-to-register, i.e., "reg-reg," copy instruction. As will be appreciated by those skilled in the art, a copy instruction may involve placing values on a stack, but generally does not require placing values on a stack. Once copy instructions are assigned around definitions and uses associated with the spill candidates in step 620, process flow returns to step 604 where a new interference graph is built.

Returning to step 612 and the determination of whether an attempt at coloring was successful, when it is determined that the attempt was successful, then the indication is that no spilling is necessary. That is, when coloring is determined to be successful, then no additional stack slots are required to store variables. In the described embodiment, there is generally a leftover color associated with the coloring process. Accordingly, an attempt at coloring is typically successful. Hence, process flow proceeds to step 628 in which each copy associated with copy instructions assigned around definitions and uses is assessed to determine whether it corresponds to a store instruction, a load instruction, or a register-to-register copy instruction. Such a determination is necessary because the real copy instructions in the CPU generally may not move values between stack slots and registers. Load and store instructions are typically required in order to move values between stack slots and registers.

From step 628, process flow moves to step 632 where the size of a stack frame which includes stack slots allocated in step 624 is determined. As previously mentioned, the generation of calling convention code uses information such as the size of a stack frame. While the size of a stack frame may depend upon a variety of different factors, in the described embodiment, the size of the stack frame is dependent upon the largest stack slot in the associated namespace, as will be appreciated by those skilled in the art. Once the size of the stack frame is determined, the stack is cleaned in step 636. Cleaning up the stack generally includes converting copies into loads and stores as appropriate. In the described embodiment, no special "pass" to generate saves and restores of callee-save registers, i.e., prolog and epilog code, is required. After the stack is cleaned up, the process of performing an allocation is completed.

Figure 7:
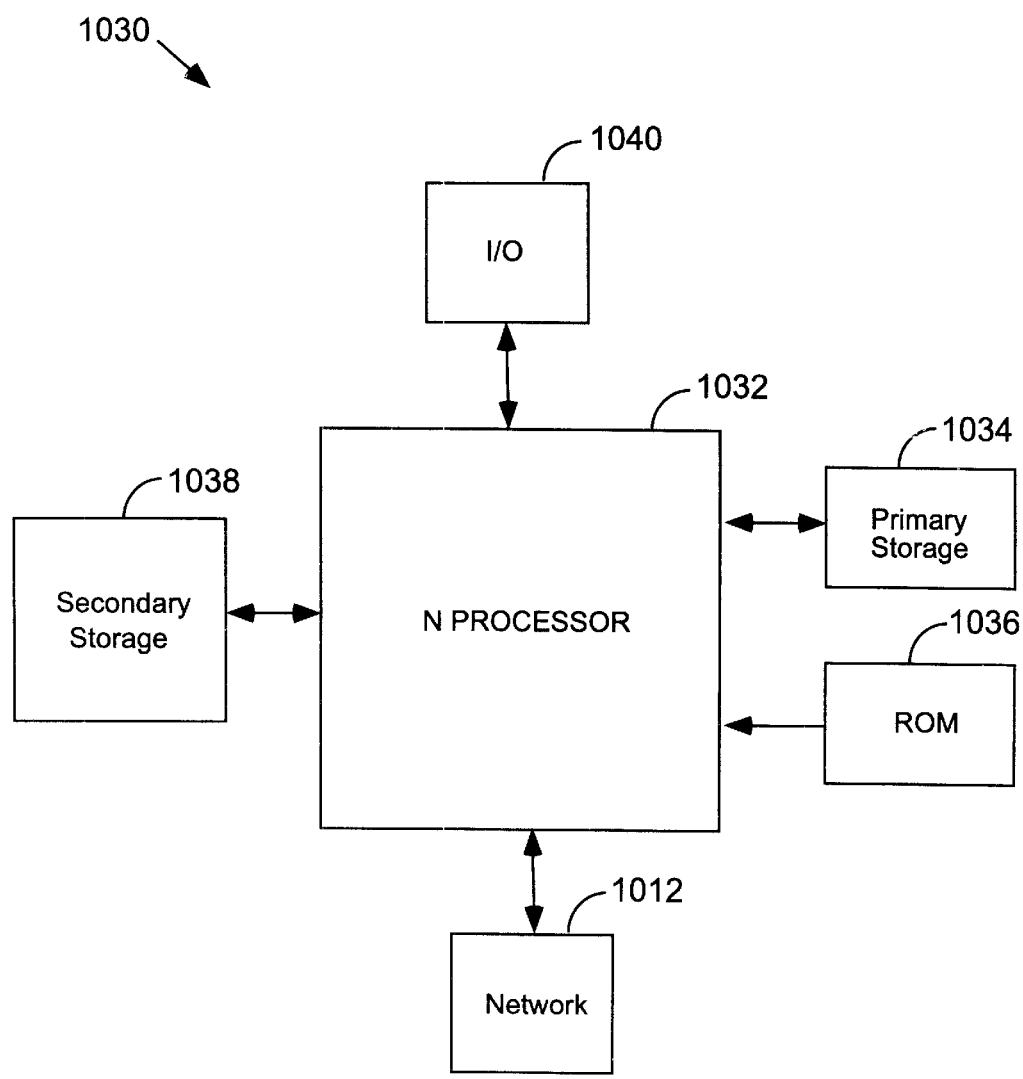
FIG. 7 is a diagrammatic representation of a general purpose computer system suitable for implementing the present invention.

FIG. 7 illustrates a typical, general purpose computer system suitable for implementing the present invention. The computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM).

Computer system 1030 or, more specifically, CPU 1032, may be arranged to support a virtual machine, as will be appreciated by those skilled in the art. One example of a virtual machine that is supported on computer system 1030 will be described below with reference to FIG. 8. As is well known in the art, ROM acts to transfer data and instructions uni-directionally to the CPU 1032, while RAM is used typically to transfer data and instructions in a bidirectional manner. CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1012. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Figure 8:
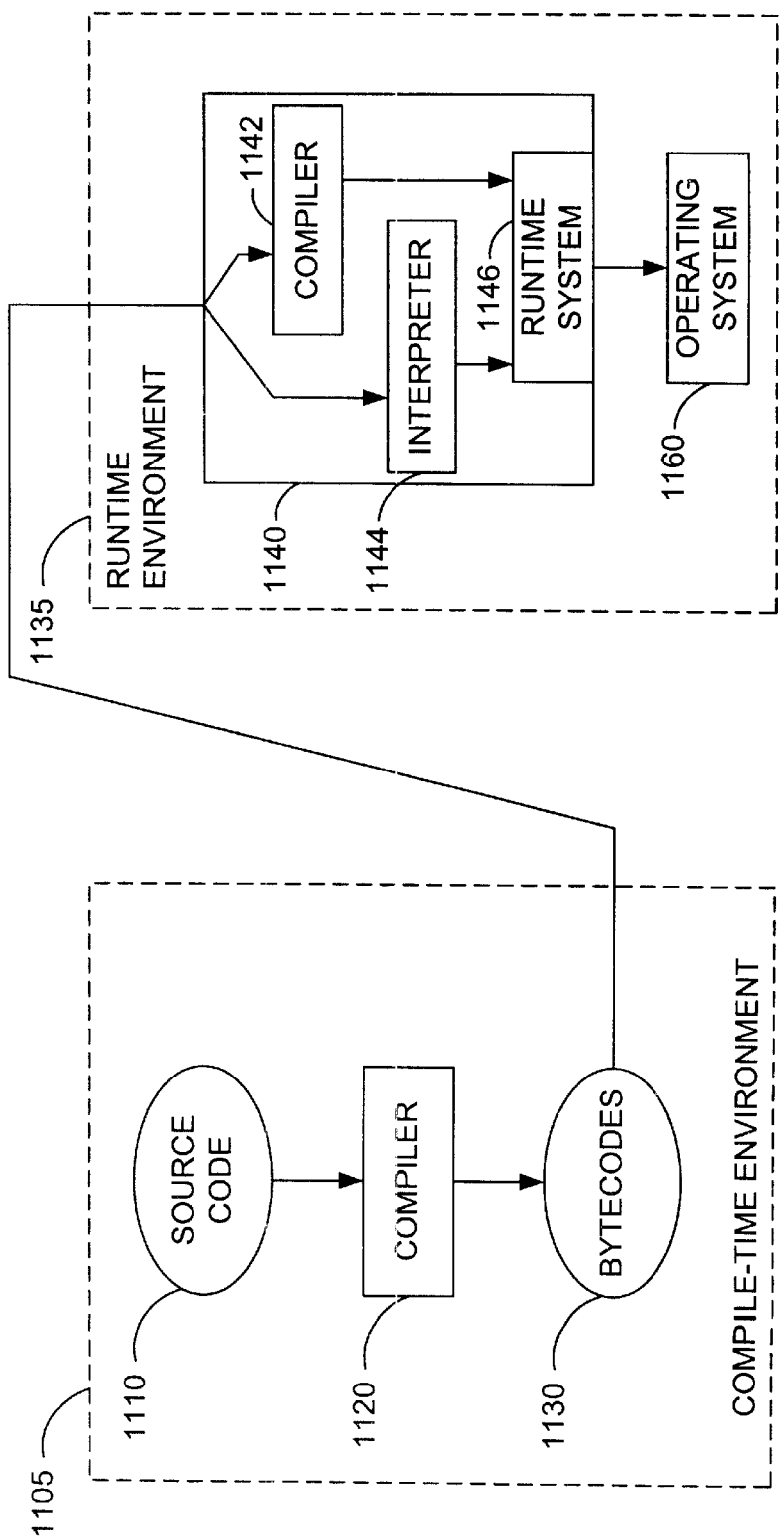
FIG. 8 is a diagrammatic representation of a virtual machine which is supported by the computer system of FIG. 7, and is suitable for implementing the present invention.

As previously mentioned, a virtual machine may execute on computer system 1030. FIG. 8 is a diagrammatic representation of a virtual machine which is supported by computer system 1030 of FIG. 7, and is suitable for implementing the present invention. When a computer program, e.g., a computer program written in the Java™ programming language developed by Sun Microsystems of Palo Alto, Calif., is executed, source code 1110 is provided to a compiler 1120 within a 10 compile-time environment 1105. Compiler 1120 translates source code 1110 into byte codes 1130. In general, source code 1110 is translated into byte codes 1130 at the time source code 1110 is created by a software developer.

Byte codes 1130 may generally be reproduced, downloaded, or otherwise distributed through a network, e.g., network 1012 of FIG. 7, or stored on a storage device such as primary storage 1034 of FIG. 7. In the described embodiment, byte codes 1130 are platform independent. That is, byte codes 1130 may be executed on substantially any computer system that is running a suitable virtual machine 1140. By way of example, in a Java™ environment, byte codes 1130 may be executed on a computer system that is running a Java™ virtual machine.

Byte codes 1130 are provided to a runtime environment 1135 which includes virtual machine 1140. Runtime environment 1135 may generally be executed using a processor such as CPU 1032 of FIG. 7. Virtual machine 1140 includes a compiler 1142, an interpreter 1144, and a runtime system 1146. Byte codes 1130 may generally be provided either to compiler 1142 or interpreter 1144.

When byte codes 1130 are provided to compiler 1142, methods contained in byte codes 1130 are compiled into machine instructions, as described above. On the other hand, when byte codes 1130 are provided to interpreter 1144, byte codes 1130 are read into interpreter 1144 one byte code at a time. Interpreter 1144 then performs the operation defined by each byte code as each byte code is read into interpreter 1144. In general, interpreter 1144 processes byte codes 1130 and performs operations associated with byte codes 1130 substantially continuously.

When a method is called from an operating system 1160, if it is determined that the method is to be invoked as an interpreted method, runtime system 1146 may obtain the method from interpreter 1144. If, on the other hand, it is determined that the method is to be invoked as a compiled method, runtime system 1146 activates compiler 1142. Compiler 1142 then generates machine instructions from byte codes 1130, and executes the machine-language instructions. In general, the machine-language instructions are discarded when virtual machine 1140 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference in its entirety.

Although only a few embodiments of the present invention have been described, it should be understood that the present invention may be embodied in many other specific forms without departing from the spirit or the scope of the invention. By way of example, steps involved with generating machine instructions associated with a calling convention may be reordered, removed or added. In general, steps involved with the methods of the present invention may be reordered, removed, or added without departing from the spirit or the scope of the present invention.

A callee-save register, as will be appreciated by those skilled in the art, is a register that a subroutine call may not destroy the contents of. One example of a callee-save register is an EDI register in an Intel 80×86 CPU. Typically, a computer system may not use register space associated with callee-save registers. Instead, the number of callee-save registers which are in use are counted, and a spill is performed to obtain stack slots to compensate for all callee-save registers up front. The present invention may be implemented for use with a callee-save register by saving information associated with the callee-save register into a stack, using the callee-save register as a "regular" register, then returning the information associated to the calleesave register. Specifically, an attempt is made to avoid using space associated with a callee-save register whenever possible. However, when the space is needed, the space is claimed for use. It should be appreciated that a register allocator which may substantially automatically generate calling convention code is generally arranged to handle incoming arguments to a call, outgoing arguments from a call, callee-save registers, and caller-save registers.

While a method of building a calling convention using a register allocator has been described as including the use of the register allocator to allocate stack slots as necessary, it should be appreciated that alternative methods and mechanisms may instead be used to allocate stack slots. For instance, the stack slots may be allocated using conventional methods, as described in above-referenced U.S. patent application Ser. No. 09/298,318.

The number of bits associated with a register mask may generally be widely varied, depending, for example, upon the platform with which the register mask is associated. Although the present invention has been described as being suitable for use with an Intel platform, the present invention may be implemented for use with substantially any suitable platform including, but not limited to, a Power PC platform and a Sparc platform. Therefore, the present examples are to be considered as illustrative and not restrictive, and the invention is not to be limited to the details given herein, but may be modified within the scope of the appended claims.

What is claimed is:

1. A computer-implemented method for building a calling convention, the calling convention being associated with a call to a subroutine in an object-based system, the computer-implemented method comprising:

obtaining source code, the source code being suitable for compilation;

creating a plurality of register masks, each of the plurality of register masks having an associated variable, each associated variable having an associated live range, each associated variable further being included in the source code;

determining an intersection of the plurality of register masks;

performing a register allocation, wherein the performing the register allocation includes using the intersection and generating code associated with the calling convention; and if the register allocation results in a spill candidate, then assigning a copy instruction after a definition associated with the spill candidate and before an instruction in the code that uses the spill candidate.

2. A computer-implemented method as recited in claim 1 further including:

converting the code associated with the calling convention into machine instructions, the machine instructions being suitable for execution by a computing system.

3. A computer-implemented method as recited in claim 1 wherein determining the intersection of the plurality of register masks includes:

identifying a valid register for a variable associated with the intersection.

4. A computer-implemented method as recited in claim 1 wherein determining the intersection of the plurality of register masks includes:

identifying a stack slot for a variable associated with the intersection.

5. A computer-implemented method as recited in claim 1 further including:

generating an interference graph using the intersection.

6. A computer-implemented method as recited in claim 5 further including:

coloring the interference graph.

7. A computer-implemented method as recited in claim 1 wherein performing the register allocation includes:

allocating a register; and allocating a stack slot.

8. A computer system arranged to build a calling convention, the calling convention being associated with a call to a subroutine in an object-based system associated with the computer system, the computer system comprising:

a processor;

a source code input mechanism arranged to obtain source code, the source code being suitable for compilation;

a register mask generator arranged to create a plurality of register masks, each of the plurality of register masks having an associated variable, each associated variable having an associated live range;

a determinator arranged to determining an intersection of the plurality of register masks; and a compiler, the compiler including a register allocator, wherein the register allocator is arranged to generate code associated with the calling convention using the intersection, the register allocator further being configured to assign a copy instruction in the code.

9. A computer system as recited in claim 8 wherein the compiler is arranged to convert the code associated with the calling convention into machine instructions, the machine instructions being suitable for execution.

10. A computer system as recited in claim 8 wherein the register allocator is further arranged to allocating a register and to allocate a stack slot.

11. A computer program product for building a calling convention in an object-based system, the computer program product comprising:

computer code for creating a plurality of register masks, each of the plurality of register masks having an associated variable, each associated variable having an associated live range;

computer code for determining an intersection of the plurality of register masks;

computer code for allocating registers, the computer code for allocating registers including computer code for using the intersection to generate the calling convention;

computer code for determining if the register allocation results in a spill candidate, whereby the computer code then assigns a copy instruction after a definition associated with the spill candidate and before an instruction in the code that uses the spill candidate; and a computer readable medium that stores the computer codes.

12. A computer program product according to claim 11 wherein the computer readable medium is one selected from the group consisting of a data signal embodied in a carrier wave, a floppy disk, a CD-ROM, a tape drive, an optical drive, flash memory, and a hard drive.

* * * * *